United States Patent
Nikolov (10) Patent No.: US 10,901,245 B2
(45) Date of Patent: Jan. 26, 2021

(54) ELECTRO-OPTIC MODULATOR WITH ELECTRODE INTERFACE REGION TO IMPROVE SIGNAL PROPAGATION CHARACTERISTICS

(71) Applicant: THE BOEING COMPANY, Chicago, IL (US)

(72) Inventor: Anguel Nikolov, Culver City, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/208,268

(22) Filed: Dec. 3, 2018

(65) Prior Publication Data

US 2020/0174290 A1    Jun. 4, 2020

(51) Int. Cl.
*G02F 1/03*       (2006.01)
*G02F 1/035*      (2006.01)

(52) U.S. Cl.
CPC .......... *G02F 1/0356* (2013.01); *G02F 1/0316* (2013.01); *G02F 2202/20* (2013.01); *G02F 2203/50* (2013.01)

(58) Field of Classification Search
CPC .. G02F 1/0356; G02F 1/0316; G02F 2202/20; G02F 2203/50
See application file for complete search history.

(56) References Cited

U.S. PATENT DOCUMENTS

| | | | |
|---|---|---|---|
| 5,138,480 A * | 8/1992 | Dolfi | G02F 1/2255 359/251 |
| 6,545,791 B1 | 4/2003 | McCaughan et al. | |
| 6,700,691 B2 * | 3/2004 | Nespola | G02F 1/0356 359/237 |
| 6,867,134 B2 * | 3/2005 | Chen | G02F 1/0316 438/686 |
| 7,408,693 B2 * | 8/2008 | Kissa | G02F 1/0123 359/245 |

(Continued)

FOREIGN PATENT DOCUMENTS

WO    WO 2017154631 A1 *  9/2017

OTHER PUBLICATIONS

Majkic, Aleksej, Electro-optically tunable microring resonators in fluorine implanted lithium niobate, Dissertation, https://doi.org/10.3929/ethz-a-005775357, 2009 (Year: 2009).*

(Continued)

*Primary Examiner* — Peter Radkowski
(74) *Attorney, Agent, or Firm* — Moore IP Law (57) ABSTRACT

An electro-optic modulator device includes a first optical waveguide region of a substrate and a second optical waveguide region of the substrate. The first optical waveguide region and the second optical waveguide region have crystalline structures. The electro-optic modulator device also includes a first electrode interface region of the substrate on a first side of the first optical waveguide region, a second electrode interface region of the substrate on a second side of the first optical waveguide region and on a first side of the second optical waveguide region, and a third electrode interface region on a second side of the second optical waveguide region. Each of the first electrode interface region, the second electrode interface region, and the third electrode interface region include material having a defective crystal structure or an amorphous structure.

20 Claims, 6 Drawing Sheets

(56) References Cited

U.S. PATENT DOCUMENTS

| | | | |
|---|---|---|---|
| 7,809,218 B2* | 10/2010 | Iwata | G02F 1/0356 385/1 |
| 9,746,742 B2* | 8/2017 | Cox | G02F 1/2255 |
| 2003/0002766 A1 | 1/2003 | Pruneri et al. | |
| 2004/0002205 A1* | 1/2004 | Chen | G02F 1/0316 438/597 |
| 2005/0201686 A1 | 9/2005 | Cole et al. | |
| 2008/0069491 A1* | 3/2008 | Kissa | G02F 1/0123 385/2 |
| 2009/0028204 A1* | 1/2009 | Hiroyama | H01S 5/34333 372/50.1 |
| 2016/0191167 A1* | 6/2016 | Cox | G02F 1/2255 398/183 |
| 2019/0088943 A1* | 3/2019 | Kato | H01M 4/131 |

OTHER PUBLICATIONS

Rabiei et al., Smart guide: lithium niobate large index contrast waveguides fabricated by crystal ion slicing and wafer bonding, Proc. SPIE 5728, Integrated Optics: Devices, Materials, and Technologies IX, (Mar. 31, 2005); doi: 10.1117/12.590100 (Year: 2005).*

Karakuzu et al., Control of the properties of micro-structured waveguides in lithium niobate crystal, Optics Express, V. 21, N. 14, 2013 (Year: 2013).*

Mercante, Andrew, Design and Fabrication of Broadband Thin-Film Lithium Niobate Phase Modulators, Dissertation, Fall 2018. (Year: 2018).*

Levy et al., Chapter 12 Single-Crystal Lithium Niobate Films by Crystal Ion Slicing, 2004 (Year: 2004).*

Foster et al., Optical attenuation in defect-engineered silicon rib waveguides, J. Appl. Phys. 99, 073101 (Year: 2006).*

Fuste, Jose Antonio Ibarra, Doctor of Philosophy Dissertation "Design Rules and Optimization of Electro-Optic Modulators Based on Coplanar Waveguides" Universitat Politecnica De Catalunya Barcelonatech, Barcelona, 2013, 146 pages.

Noguchi, Lithium Niobate Modulators, Broadband Optical Modulators: Science, Technology, and Applications, Copyright 2012, EBSCO Publishing : eBook Collection (EBSCOhost)—printed on Apr. 26, 2018, pp. 151-210.

Betts, et al., "Overview of Optical Modulators and the Properties That Affect Transmission System Performance", Broadband Optical Modulators: Science, Technology, and Applications, Copyright 2012, EBSCO Publishing : eBook Collection (EBSCOhost)—printed on Mar. 23, 2018, pp. 93-152.

Gheorma, et al., Thin Layer Design of X-Cut LiNbO3 Modulators, IEEE Photonics Technology Letters, vol. 12, No. 12, Dec. 2000, pp. 1618-1620.

Muraro, Jr., A. et al., "Design Optimization of Lithium Niobate Modulators Using a Genetic Algorithm," Anais Do VWORCAP, INPE, Sao Jose dos Campos, 2005, pp. 1-6.

* cited by examiner

ELECTRO-OPTIC MODULATOR WITH ELECTRODE INTERFACE REGION TO IMPROVE SIGNAL PROPAGATION CHARACTERISTICS

FIELD OF THE DISCLOSURE

The present disclosure is generally related to high-speed electro-optic modulator devices and velocity matching between optical and radiofrequency (RF) propagating fields.

BACKGROUND

Optical signals can be formed by modulating laser light and can be transmitted via fiber optic cables. High-speed optical data communication links often use electro-optic modulators that operate based on an electro-optical effect in which an optical characteristic, such as dielectric constant, is electrically controlled. For example, a modulator based on $LiNbO_3$ can apply a RF modulating signal to vary the optical refractive index for a laser signal propagating along an optical waveguide of the modulator. To achieve high speed modulation, the RF modulating signal and laser signal are co-propagated along the modulator. However, due to the high relative permittivity of $LiNbO_3$, the microwave refractive index is much higher than the optical refractive index, leading to slower propagation of the RF field as compared to the optical signal and resulting in the RF modulating signal becoming out of phase with the optical signal. As a result, the bandwidth of the modulator is reduced and the length of the modulator is limited, which leads to reduced modulation efficiency.

SUMMARY

In a particular implementation, an electro-optic modulator device includes a first optical waveguide region of a substrate and a second optical waveguide region of the substrate. The first optical waveguide region and the second optical waveguide region have crystalline structures. The electro-optic modulator device includes a first electrode interface region of the substrate on a first side of the first optical waveguide region. The electro-optic modulator device includes a second electrode interface region of the substrate on a second side of the first optical waveguide region and on a first side of the second optical waveguide region. The electro-optic modulator device also includes a third electrode interface region on a second side of the second optical waveguide region. Each of the first electrode interface region, the second electrode interface region, and the third electrode interface region including material having a defective crystal structure or an amorphous structure.

In another particular implementation, a system to modulate signals carried via optical fiber includes a first coupler configured to couple to a first optical fiber and a second coupler configured to couple to a second optical fiber. The system includes an electro-optic modulator device coupled to the first coupler and to the second coupler. The electro-optic modulator device includes a substrate. The substrate defines a first optical waveguide region and a second optical waveguide region. The first optical waveguide region and the second optical waveguide region have crystalline structures. The substrate also defines a first electrode interface region on a first side of the first optical waveguide region, a second electrode interface region on a second side of the first optical waveguide region and a first side of the second optical waveguide region, and a third electrode interface region on a second side of the second optical waveguide region. At least one of the first electrode interface region, the second electrode interface region, or the third electrode interface region includes material having a defective crystal structure or an amorphous structure. The electro-optic modulator device also includes a first electrode coupled to the first electrode interface region, a second electrode coupled to the second electrode interface region, and a third electrode coupled to the third electrode interface region.

In another particular implementation, a method of forming an electro-optic modulator includes forming a plurality of electrode interface regions in a substrate by selective ion implantation of materials to form defects reducing an electric permittivity in a lattice structure of the substrate. The plurality of electrode interface regions are formed in positions that distinguish a first optical waveguide region and a second optical waveguide region in the substrate. The method also includes forming a plurality of electrodes including one electrode, respectively, on each electrode interface region of the plurality of electrode interface regions.

The features, functions, and advantages described herein can be achieved independently in various implementations or may be combined in yet other implementations, further details of which can be found with reference to the following description and drawings.

DETAILED DESCRIPTION

A variety of techniques can be applied to improve electro-optic modulation bandwidth by improving matching of optical field propagation and RF field propagation. For example, a conventional thickness of a $LiNbO_3$ material of 9-10 micrometers, corresponding to a single mode optical fiber, can be reduced to 5 micrometers or below. However, reducing the thickness of the $LiNbO_3$ material introduces significant optical losses due to the small cross-section of the optical waveguide, which leads to inefficient modulation, necessitates use of complicated and expensive optics for coupling, and leads to reduced environmental operating conditions. Another technique to improve a match between the propagation velocities of optical signals and RF modulating signals is to increase the height of electrodes that receive the RF modulation signals; however, increasing electrode height provides only partial improvement in propagation velocity matching and has physical limitations with regard to structural stability. In addition, increasing electrode height reduces the electrical field inside the optical mode, which reduces efficiency. Another technique to improve a match between the propagation velocities of optical signals and RF modulating signals is to introduce a low-dielectric material between the electrodes and the LiNbO₃ material. However, introducing the low-dielectric material reduces the electrical field inside the optical mode and leads to overall efficiency degradation.

To overcome various drawbacks of the above techniques, embodiments disclosed herein enable matching of propagation velocities of optical signals and RF modulating signals, while maintaining RF impedance matching and low optical loss. This allows high modulation efficiency and extends the bandwidth of the modulator towards a bandwidth limit of the materials. Electro-optic modulators according to the disclosed embodiments enable efficient operation with bandwidths of 100 Gigahertz (GHz) or more. A method to selectively reduce the relative permittivity (dielectric constant) of electro-optic structures, such as LiNbO₃ crystals, is introduced enabling design of ultra-high speed electro-optic modulators that use reduced dielectric constant areas under their electrodes in order to decrease the microwave index and increase the microwave propagation speed. The matching of optical propagation speed and RF propagation speed, along traveling waveguide structures, enables fabrication of devices with very high modulation bandwidth and efficiency.

Although techniques described herein use LiNbO₃ as an example of a crystal that has a high-quality crystalline structure that provides a pronounced electro-optic effect, such techniques are not limited to devices using LiNbO₃. Although LiNbO₃ has a high-quality crystalline structure that provides a pronounced electro-optic, the crystal structure is also responsible for high relative permittivity responsive to an applied external field, collective charge shifts that create internal polarization, and cancelation of the applied field inside the dielectric. According to techniques described herein, the pristine crystal structure is preserved in the areas for optical waveguides, but the crystal structure is broken or made amorphous under the electrodes. When the crystal structure is disrupted, the coordinated arrangement of the ions is disturbed, which reduces the material's polarizability and relative permittivity. The relative permittivity is the lowest when the material is amorphous. In some implementations, the breaking of the crystal structure is achieved with high energy selective ion implantation underneath the electrodes prior to metallization. The selective ion implantation can use any of several different ions, such as carbon. The areas of defect-induced or amorphous LiNbO₃ can be accurately defined with lithography, allowing tailoring of the electromagnetic properties of coplanar waveguides (CPW) used for RF transmission. By properly scaling these areas in coordination with the metallization geometry, the CPW microwave index, RF impedance, and microwave loss can be tuned independently of the optical properties of the device. This allows preserving optical properties and separately improving or optimizing the RF performance.

Figure 1:
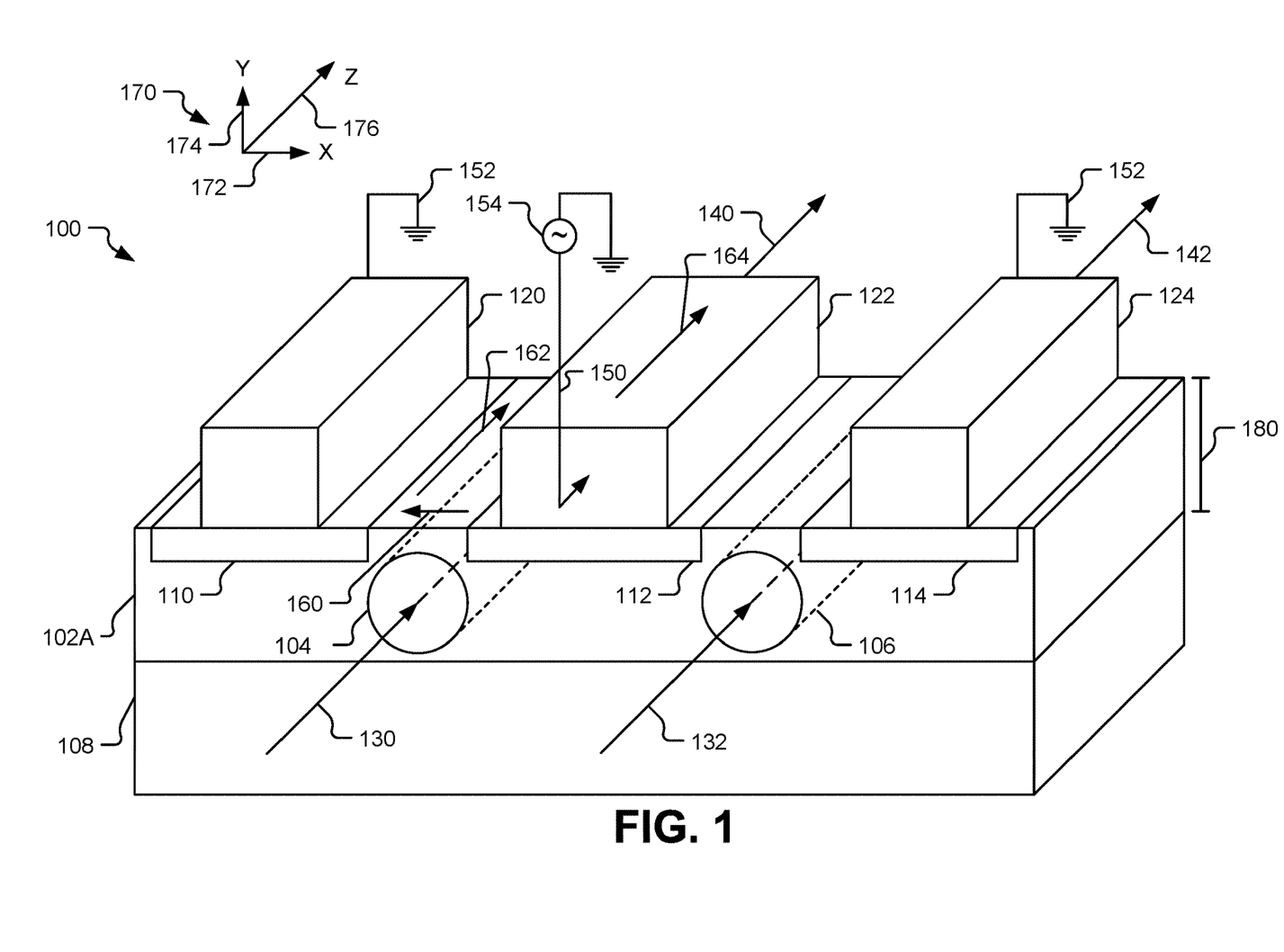
FIG. 1 is a diagram that illustrates a perspective view of a particular implementation of an electro-optic modulator device.

FIG. 1 is a diagram that illustrates a perspective view of a particular example of an electro-optic modulator device 100. The electro-optic modulator device 100 includes a first optical waveguide region 104 and a second optical waveguide region 106 of a substrate 102 (e.g. 102A). The electro-optic modulator device 100 also includes a first electrode interface region 110 of the substrate 102A, a second electrode interface region 112 of the substrate 102A, and a third electrode interface region 114 of the substrate 102A. A first electrode 120 is coupled to the first electrode interface region 110, a second electrode 122 is coupled to the second electrode interface region 112, and a third electrode 124 is coupled to the third electrode interface region 114.

The electro-optic modulator device 100 is configured to modulate light passing through the first optical waveguide region 104 and the second optical waveguide region 106 using an electro-optic effect based on signals applied to one or more of the electrodes 120-124, as described further below.

The first electrode interface region 110 is on a first side of the first optical waveguide region 104. The second electrode interface region 112 is on a second side of the first optical waveguide region 104 and on a first side of the second optical waveguide region 106. The third electrode interface region 114 is on a second side of the second optical waveguide region 106. For example, in the perspective view of FIG. 1, the first electrode interface region 110 is on the left side of the first optical waveguide region 104, the second electrode interface region 112 is on the right side of the first optical waveguide region 104 and the left side of the second optical waveguide region 106, and the third electrode interface region 114 is on the right side of the second optical waveguide region 106.

An illustrative reference coordinate system 170 depicts an X axis 172 (horizontal in FIG. 1), a Y axis (vertical in FIG. 1), and a Z axis 176 that is substantially orthogonal to both the X axis 172 and the Y axis 174. As used herein, an "X direction" is a direction that is substantially parallel to the X axis 172, a "Y direction" is a direction that is substantially parallel to the Y axis 174, and a "Z direction" is a direction that is substantially parallel to the Z axis 176. The first optical waveguide region 104 and the second optical waveguide region 106 are arranged to enable propagation of light along the first optical waveguide region 104 and the second optical waveguide region 106 in a Z direction. Electric field lines due to voltage differences between the electrodes 120-124 cross the first optical waveguide region 104 and the second optical waveguide region 106 substantially in an X direction, illustrated as an example electric field direction 160, as described in more detail with reference to FIG. 2.

As illustrated in FIG. 1, the substrate 102A is bonded to a non-optical substrate 108, such as a silicon substrate or quartz substrate. The non-optical substrate 108 has low relative permittivity as compared to the first optical waveguide region 104 and the second optical waveguide region 106. The non-optical substrate 108 provides structural support without substantially interfering with properties of the optical waveguide regions 104, 106. In some implementations, the non-optical substrate 108 is omitted from the electro-optic modulator device 100.

The first optical waveguide region 104 and the second optical waveguide region 106 have crystalline structures that exhibit electro-optical effects and that are also referred to as electro-optic crystalline structures. As illustrative, non-limiting examples, the substrate 102A includes at least one of LiNbO₃, BaTiO₃, LiTaO₃, KTP, KNbO₃, a Lead Lanthanum Zirconium Titanate (PLZT)-type material, such as $Pb_{(1-x)}La_x(Zr_{(1-y)}Ti_y)_{(1-x/4)}O_3$, or a Barium Strontium Titanate (BST)-type material, such as $Ba_{(1-x)}Sr_xTiO_3$, where Li indicates lithium, Nb indicates niobium, O indicates oxygen, Ba indicates barium, Ta indicates tantalum, K indicates potassium, Pb indicates lead, La indicates lanthanum, Zr indicates zirconium, and Ti indicates titanium. Optical properties of the first optical waveguide region 104 and the second optical waveguide region 106 may be enhanced via diffused titanium or proton-exchange, as described further with reference to FIG. 4.

Each of the first electrode interface region 110, the second electrode interface region 112, and the third electrode interface region 114 includes material having a defective crystal structure or an amorphous structure. In a non-limiting example, the first electrode interface region 110, the second electrode interface region 112, and the third electrode interface region 114 include at least one of hydrogen (H), carbon (C), silicon (Si), germanium (Ge), fluorine (F), chlorine (Cl), argon (Ar), krypton (Kr), or xenon (Xe) as inclusions disrupting a lattice structure of the substrate 102A, such as via ion implantation, as described further with reference to FIG. 4. For example, in some implementations at least one of the first electrode interface region 110, the second electrode interface region 112, or the third electrode interface region 114 corresponds to an ion implant region of the substrate 102A in which crystal defects are introduced to form the defective crystal structure or amorphous structure with reduced relative permittivity as compared to the first optical waveguide region 104 and the second optical waveguide region 106.

In the implementation illustrated in FIG. 1, each of the first electrode interface region 110, the second electrode interface region 112, and the third electrode interface region 114 has reduced relative permittivity as compared to the first optical waveguide region 104 and the second optical waveguide region 106. Each of the electrode interface regions 110-114 having reduced permittivity as compared to the first optical waveguide region 104 and the second optical waveguide region 106 reduces a difference between a phase velocity of light along an optical waveguide propagation direction 162 (a Z direction) in the optical waveguide regions 104, 106 and microwave radiation along a modulation field propagation direction 164 (a Z direction). The optical propagation and modulation signal propagation are substantially matched. Because the microwave radiation is a transverse field, the electric field is orthogonal to the direction of propagation, in a plane parallel to the X-Y plane, such as in the electric field direction 160 (an X direction) in the optical waveguide regions 104, 106. However, in other implementations, one or more of the first electrode interface region 110, the second electrode interface region 112, or the third electrode interface region 114 does not have reduced permittivity as compared to the optical waveguide regions 104, 106. For example, an implementation in which only one of the first electrode interface region 110 or the second electrode interface region 112 has reduced permittivity may provide improved (e.g., reduced but non-zero) phase velocity difference between light propagating along the optical waveguide propagation direction 162 in the first optical waveguide region 104 and microwave radiation propagating along the modulation field propagation direction 164 as compared to an electro-optical modulator that does not have any electrode interface region with reduced permittivity.

In a particular implementation, the material in the electrode interface regions 110-114 having the defective crystal structure or amorphous structure is configured to cause an electromagnetic signal provided to the second electrode 122 to propagate with a second phase velocity that is substantially equal to a first phase velocity of light in the first optical waveguide region 104. In an example, each of the first electrode interface region 110, the second electrode interface region 112, and the third electrode interface region 114 is dimensioned such that a microwave refractive index of the electro-optic modulator device 100 in the modulation field propagation direction 164 substantially matches an optical refractive index of the first optical waveguide region 104 in the optical waveguide propagation direction 162.

The electro-optic modulator device 100 is configured to modulate a phase of a first light signal 130 propagating along the first optical waveguide region 104 to generate a first modulated light signal 140. Phase modulation of the first light signal 130 is due to the electro-optic effect of an electric field between the first electrode 120 and the second electrode 122. The electro-optic modulator device 100 is also configured to modulate a phase of a second light signal 132 propagating along the second optical waveguide region 106 to generate a second modulated light signal 142. Phase modulation of the second light signal 132 is due to the electro-optic effect of an electric field between the second electrode 122 and the third electrode 124. The electro-optic modulator device 100 is illustrated as having the second electrode 122 coupled to a signal generator 154 and configured to receive an electromagnetic signal 150 as a modulation signal at the second electrode 122. The signal generator 154 is coupled to a beginning of a propagation region (at the front edge of the second electrode 122) and there is termination at the end of the propagation region (at the back edge of the second electrode 122). The first electrode 120 and the third electrode 124 are coupled to a ground 152. As a result, substantially equal but opposite phase modulation is applied to the first light signal 130 as compared to the second light signal 132. However, in other implementations substantially equal but opposite phase modulation is achieved by coupling the signal generator 154 to each of the first electrode 120 and the third electrode 124 and coupling the second electrode 122 to ground. In other implementations, the first light signal 130 and the second light signal 132 are independently modulated via application of distinct modulation signals to two or more of the electrodes 120-124.

By disrupting the crystalline structure in the electrode interface regions 110-114, the propagation speed of the modulation signal 150 along the modulation field propagation direction 164 approximately equals the propagation speed of the light signals 130, 132 through the optical waveguide regions 104, 106. This enables high-bandwidth (e.g., 100 GHz or higher) modulation without having to thin the substrate 102A to a size that increases scattering and that requires use of costly optics, without having to reduce efficiency by shortening the modulator width, and without weakening structural integrity due to exaggerated electrode height. As a result, in some implementations a first cross-section of the first optical waveguide region 104 (e.g., in the X-Y plane) and a second cross-section of the second optical waveguide region 106 (e.g., in the X-Y plane) can each have a characteristic dimension greater than or equal to 9 micrometers for enhanced compatibility with a conventional optical fiber size. However, in other implementations the electro-optic modulator device 100 is sized so that a portion of the substrate 102A that exhibits an electro-optical effect has the thickness 180 greater than or equal to 3 micrometers (e.g., 3-5 micrometers) in a direction (e.g., a Y direction) that is orthogonal to the optical waveguide propagation direction 162.

Figure 2:
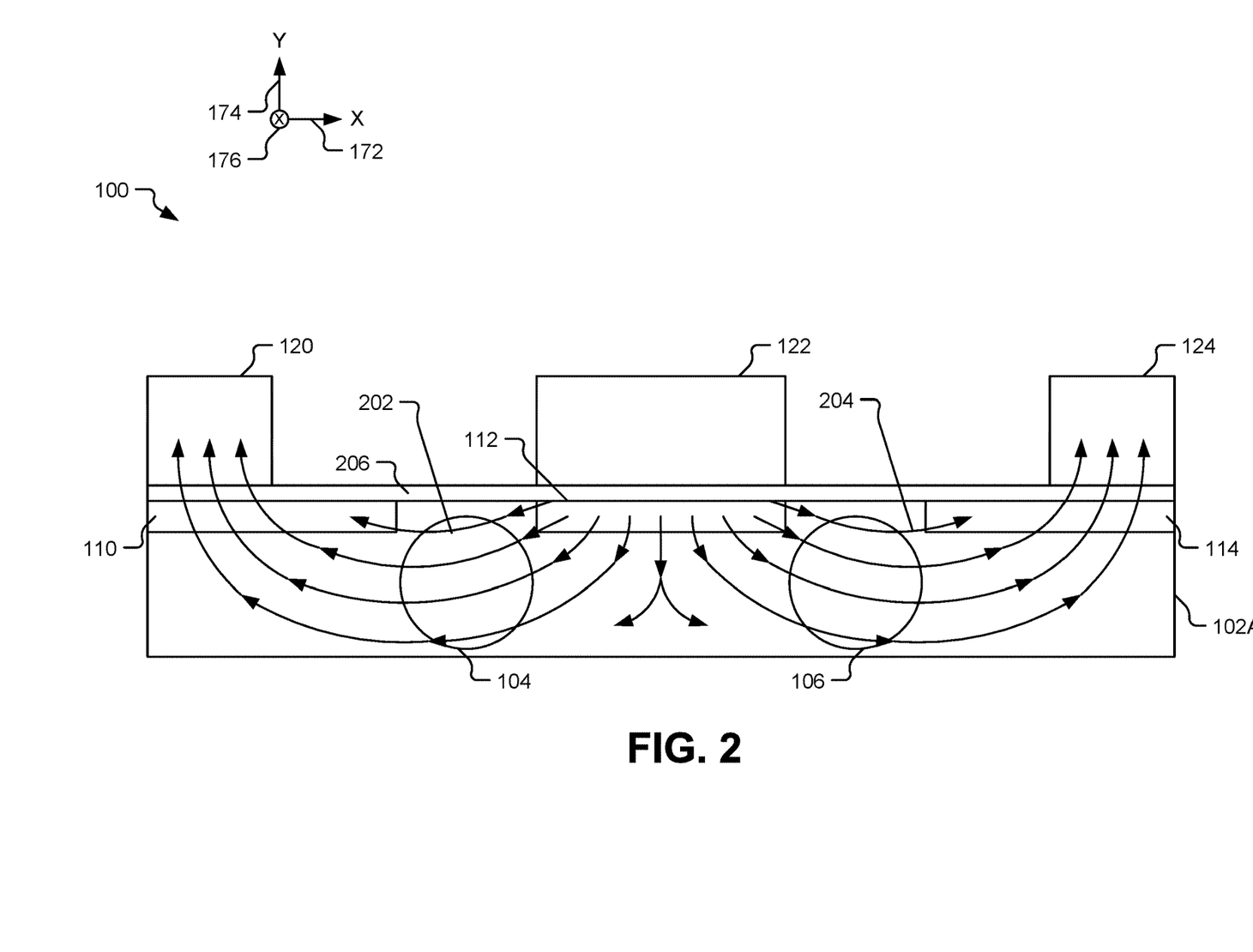
FIG. 2 is a diagram that illustrates a cross-sectional view of the electro-optic modulator device of FIG. 1.

FIG. 2 illustrates a cross-sectional view of the electro-optic modulator device 100 of FIG. 1. First field lines, such as a representative first field line 202, are illustrated crossing the first optical waveguide region 104 from the second electrode 122 to the first electrode 120 via the second electrode interface region 112 and the first electrode interface region 110. Second field lines, such as a representative second field line 204, are illustrated crossing the second optical waveguide region 106 from the second electrode 122 to the third electrode 124 via the second electrode interface region 112 and the third electrode interface region 114. A layer 206 is an optional layer that has lower dielectric constant and that can be used for additional impedance or microwave index tuning. In a particular implementation, the layer 206 includes $SiO_2$ and has a relatively small thickness, such as less than 300 nanometers (nm). The layer 206 can be used to provide surface passivation that eliminates charge migration along the surface between the electrodes, and for this purpose it can be relatively thin, such as 100-200 nm.

The dielectric constant in the substrate 102A is effectively a result of charge shifting in the crystal lattice in response to the external electric field. Degrading or making amorphous the lattice in the first electrode interface region 110, the second electrode interface region 112, and the third electrode interface region 114, reduces the dielectric constant by reducing this charge shifting effect. The distances between the first electrode interface region 110, the second electrode interface region 112, and the third electrode interface region 114, and the depths of the first electrode interface region 110, the second electrode interface region 112, and the third electrode interface region 114 can be selected to achieve a match between microwave and optical mode velocities at the optical waveguide regions 104, 106.

Although FIGS. 1-2 illustrate an implementation in which the bottom surface of the substrate 102A is substantially planar, in other implementations one or more variations may be used. For example, an air gap may be etched into the bottom surface of the substrate 102A under the center second electrode 122 and the optical waveguide regions 104, 106 prior to bonding with the non-optical substrate 108, resulting in higher electrical field strength and lower half-wavelength voltage ($V_\pi$) (the voltage for inducing a 180-degree phase shift). As another example, etched grooves, buried electrodes, or a combination thereof, may be implemented to increase electrical field strength.

Figure 3:
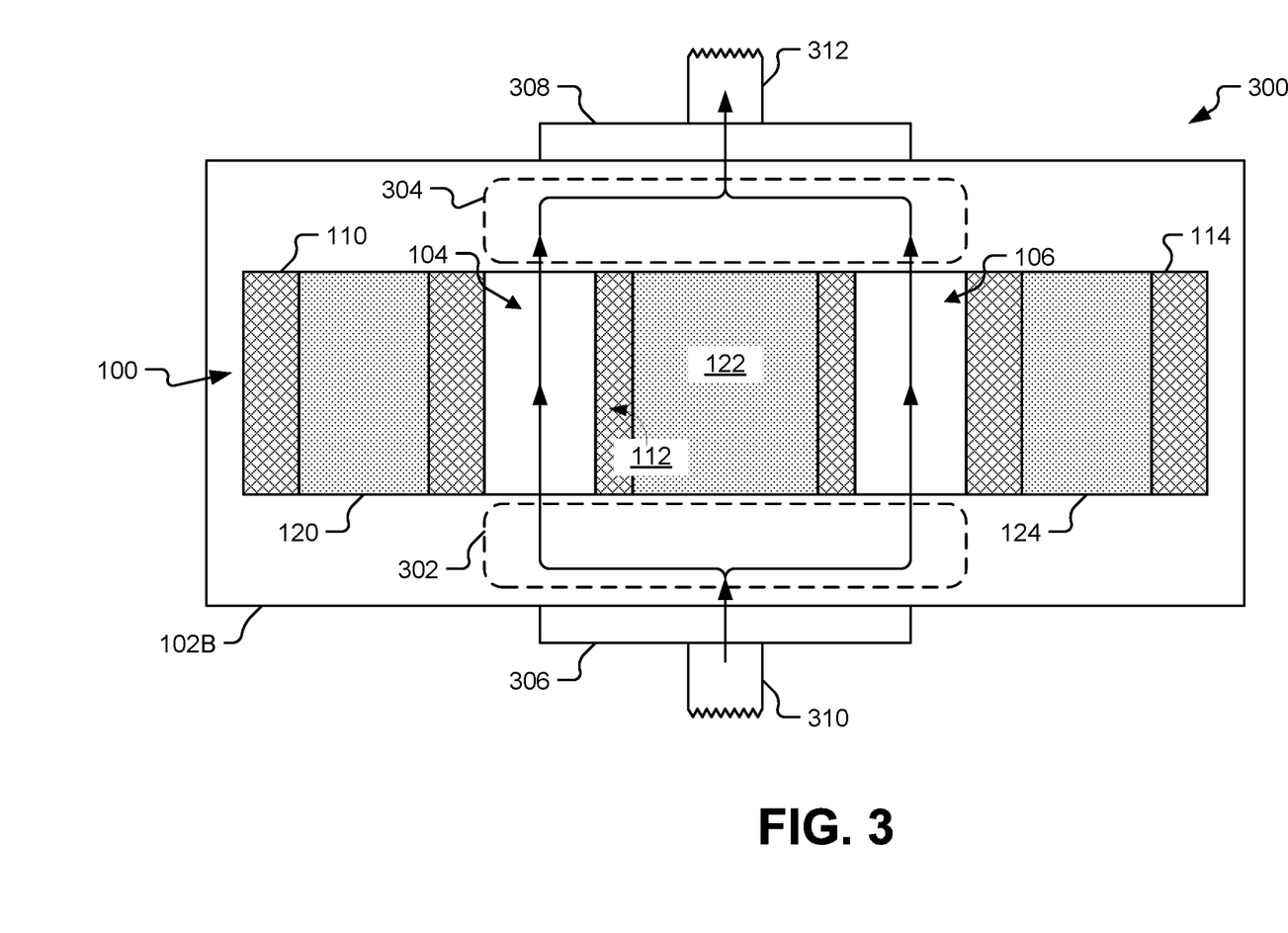
FIG. 3 is a diagram that illustrates a top view of a system that includes the electro-optic modulator device of FIG. 1.

In some implementations, the substrate 102A further defines an input optical splitter waveguide region and an output optical combiner waveguide region, such as described further with reference to FIG. 3. In such implementations, the first optical waveguide region 104, the second optical waveguide region 106, the input optical splitter waveguide region, and the output optical combiner waveguide region together define an optical interferometry path. However, in other implementations the electro-optic modulator device 100 does not function as an optical interferometer and the modulated light signals 140, 142 are used as independent, phase modulated optical signals rather than being combined. Similarly, although the electro-optic modulator device 100 is illustrated as including three electrodes 120-124 to modulate signals in two optical waveguide regions 104, 106, in other implementations any number of electrodes and optical waveguide regions can be used, such as a single optical waveguide between two electrode interface regions, four optical waveguides between five electrode interface regions, or any other configuration.

FIG. 3 illustrates a particular implementation of a system 300 to modulate signals carried via optical fiber. The system 300 includes a first coupler 306 configured to couple to a first optical fiber 310 and a second coupler 308 configured to couple to a second optical fiber 312. The system 300 also includes the electro-optic modulator device 100 of FIG. 1 coupled to the first coupler 306 and to the second coupler 308.

The electro-optic modulator device 100 includes a substrate 102 (e.g. 102B) defining the first optical waveguide region 104 and the second optical waveguide region 106. The first optical waveguide region 104 and the second optical waveguide region 106 have crystalline structures. The electro-optic modulator device 100 also includes the first electrode interface region 110 on a first side of the first optical waveguide region 104, the second electrode interface region 112 on a second side of the first optical waveguide region 104 and a first side of the second optical waveguide region 106, and a third electrode interface region 114 on a second side of the second optical waveguide region 106. As described with reference to FIG. 1, at least one of the first electrode interface region 110, the second electrode interface region 112, or the third electrode interface region 114 includes material having a defective crystal structure or an amorphous structure. The electro-optic modulator device 100 includes the first electrode 120 coupled to the first electrode interface region 110, the second electrode 122 coupled to the second electrode interface region 112, and the third electrode 124 coupled to the third electrode interface region 114.

The substrate 102B defines an input optical splitter waveguide region 302 coupled to the first optical waveguide region 104 and to the second optical waveguide region 106. The substrate 102B also defines an output optical combiner waveguide region 304 coupled to the first optical waveguide region 104 and to the second optical waveguide region 106. The first optical waveguide region 104, the second optical waveguide region 106, the input optical splitter waveguide region 302, and the output optical combiner waveguide region 304 together define an optical interferometry path.

To illustrate, an input signal from the first optical fiber 310 is split and routed to the first optical waveguide region 104 and to the second optical waveguide region 106. The signals are modulated (e.g., phase modulated) in the optical waveguide regions 104, 106. The modulated signals are combined in the output optical combiner waveguide region 304 to generate an amplitude-modulated signal that is output via the second optical fiber 312.

In some implementations, the substrate 102B has a thickness in a direction orthogonal to a propagation direction of the first optical waveguide region 104 (e.g., the thickness 180 in the Y direction as in FIG. 1) that is greater than or equal to 3 micrometers. For example, the thickness can be in the range of 9-10 micrometers, corresponding to a standard single mode fiber. As another example, the thickness can be in the range from 3-9 micrometers to yield lower half-wavelength voltage $V_\pi$ and higher efficiency.

Figure 4A:
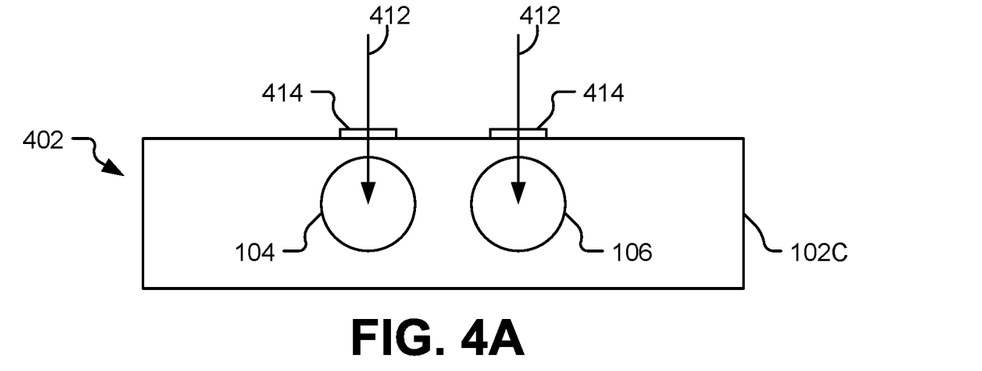
FIGS. 4A, 4B, and 4C are diagrams that illustrate examples of structures in accordance with a method of forming the electro-optic modulator device of FIG. 1.

FIGS. 4A, 4B, and 4C are diagrams that illustrate examples of structures associated with forming the electro-optic modulator device 100 of FIG. 1. In FIG. 4A, a first structure 402 is formed that includes the first optical waveguide region 104 and second optical waveguide region 106 in a substrate 102 (e.g. 102C). As described with reference to FIGS. 1-3, in some implementations the substrate 102C includes at least one of $LiNbO_3$, $BaTiO_3$, $LiTaO_3$, KTP, $KNbO_3$, a Lead Lanthanum Zirconium Titanate (PLZT)-type material, such as $Pb_{(1-x)}La_x(Zr_{(1-y)}Ti_y)_{(1-x/4)}O_3$, or a Barium Strontium Titanate (BST)-type material, such as $Ba_{(1-x)}Sr_xTiO_3$.

Formation of the first optical waveguide region 104 and the second optical waveguide region 106 can include proton exchange 412 in which the first structure 402 is introduced into an acid melt process that sources hydrogen ions, the melt is heated and an exchange of Li and H ions occurs, changing the optical index and forming a core. As another example, a thin film of material, such as titanium 414, can be deposited onto the substrate 102C, and the substrate 102C can be heated to cause diffusion of the material into the first optical waveguide region 104 and the second optical waveguide region 106. The width of the film (e.g., the width of the titanium 414) and the duration of heating define the lateral and vertical dimensions of the core, which guides the optical mode and increases the index of refraction.

Figure 4B:
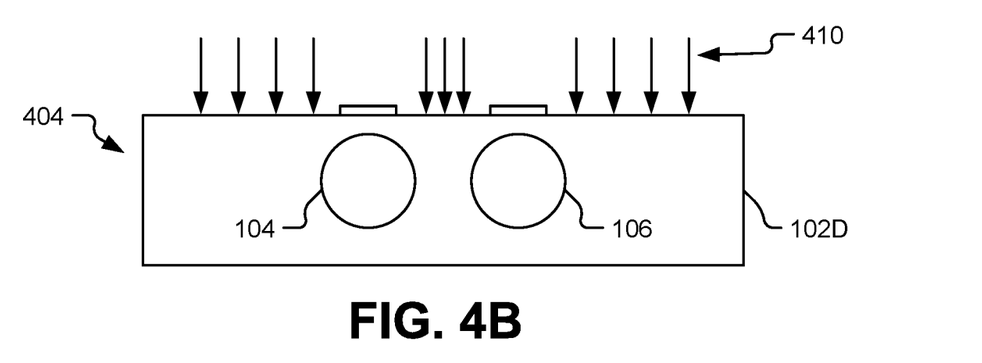

In FIG. 4B, a second structure 404 is formed via ion implantation 410 applied to a substrate 102 (e.g 102D) that includes the optical waveguide regions 104, 106. In some implementations, the ion implantation 410 implants ions of H, C, Si, Ge, F, Cl, Ar, Kr, Xe, or any combination thereof, into the substrate 102D. Because the amorphous or defective crystal structure generated by the ion implantation 410 can be at least partially returned to a crystalline structure via high-temperature annealing, high-temperature processing to form the optical waveguide regions 104, 106 of FIG. 4A is performed prior to the ion implantation 410.

Figure 4C:
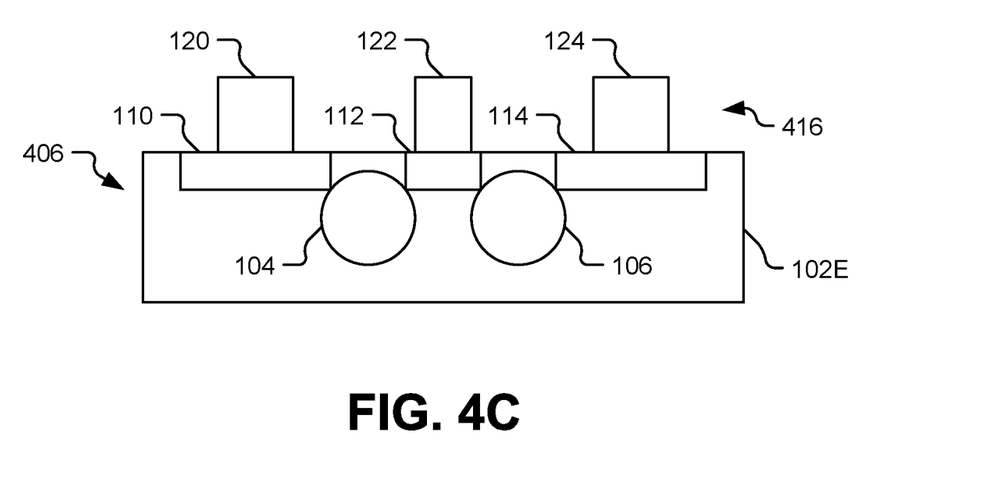

In FIG. 4C, a third structure 406 includes the electrode interface regions 110, 112, and 114 having the amorphous or defective crystal structure generated by the ion implantation 410 of FIG. 4B. The third structure 406 is formed to include a plurality of electrodes 416 by the addition of the electrodes 120-124 to the electrode interface regions 110-114. The third structure 406 includes a substrate 102 (e.g. 102E) that includes the optical waveguide regions 104, 106 between the electrode interface regions 110-114. The third structure 406 can correspond to the electro-optic modulator device 100 of FIG. 1.

Figure 5:
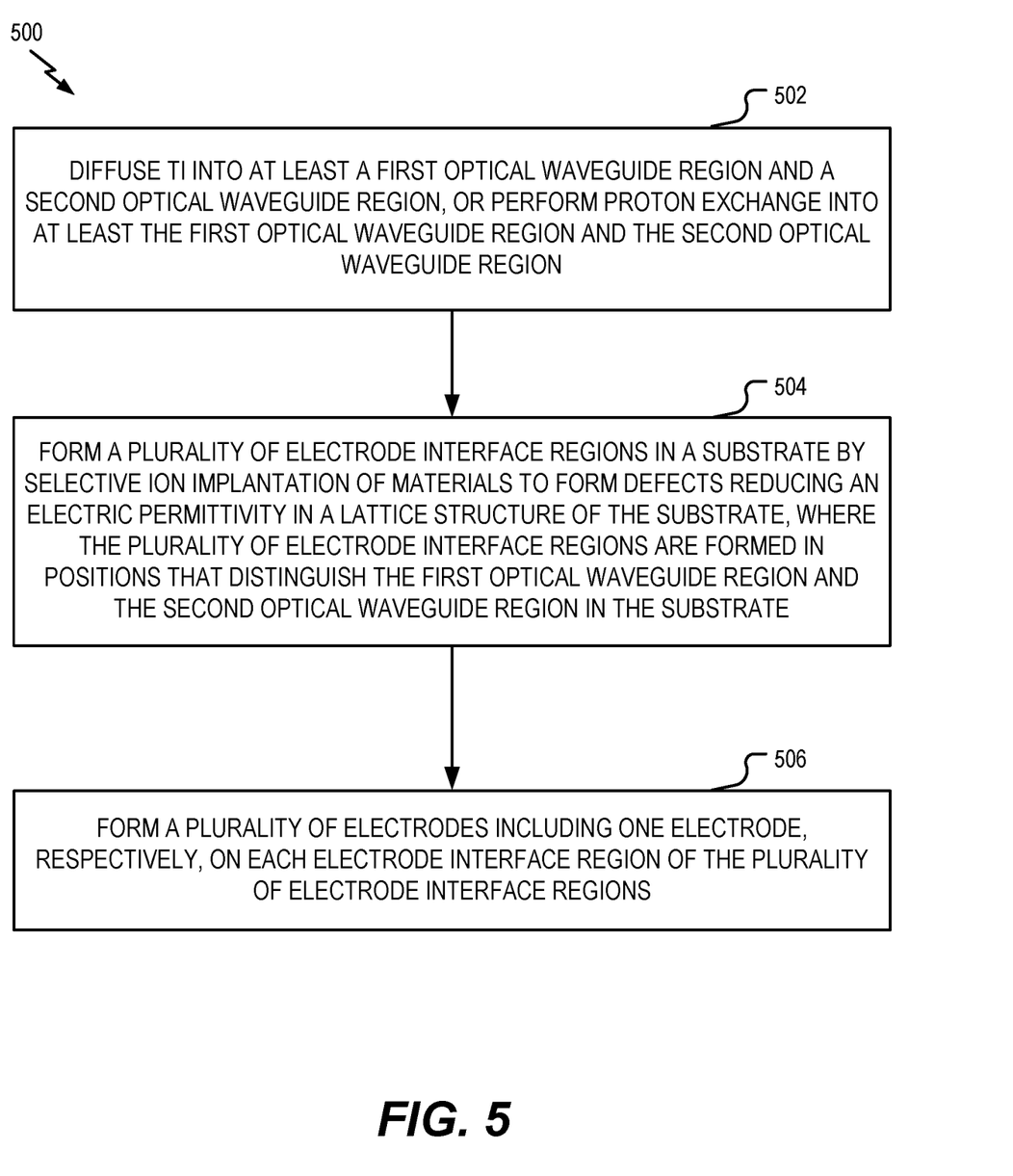
FIG. 5 is a flowchart that illustrates an example of a method of forming an electro-optic modulator device.

FIG. 5 is a flow chart of an example of a method 500 of forming an electro-optic modulator, such as the electro-optic modulator device 100 of FIG. 1. In some implementations, the method 500 includes, at block 502, at least one of diffusing titanium into at least a first optical waveguide region and a second optical waveguide region, or performing proton exchange into at least the first optical waveguide region and the second optical waveguide region. For example, as described with reference to FIG. 4A, the titanium 414 may be diffused into the optical waveguide regions 104, 106, the proton-exchange may exchange lithium with hydrogen ions, or a combination thereof.

The method 500 includes, at block 504, forming a plurality of electrode interface regions in a substrate by selective ion implantation of materials to form defects reducing an electric permittivity in a lattice structure of the substrate. The plurality of electrode interface regions are formed in positions that distinguish a first optical waveguide region and a second optical waveguide region in the substrate. As an example, the electrode interface regions are formed to be adjacent to the optical waveguide regions without overlapping the optical waveguide regions. To illustrate, the optical waveguide regions 104, 106 are formed via the ion implantation 410 of FIG. 4.

The method 500 includes, at block 506, forming a plurality of electrodes including one electrode, respectively, on each electrode interface region of the plurality of electrode interface regions. For example, the plurality of electrodes 416 of FIG. 4C are formed on the electrode interface regions 110-114.

Forming the electrode interface regions in a substrate by selective ion implantation reduces the electric permittivity in a lattice structure of the substrate. As a result, phase velocity matching may be obtained for light propagation along the optical waveguides and microwave field propagation for modulation. Phase velocity matching enables high modulation bandwidth and efficiency.

Although the method 500 is illustrated as including diffusing titanium or performing proton exchange, at block 502, in other implementations one or both of the diffusing or the proton exchange can be omitted. As another example, one or both of the diffusing or the proton exchange can be replaced with another technique for forming the optical waveguide regions 104, 106.

Figure 6:
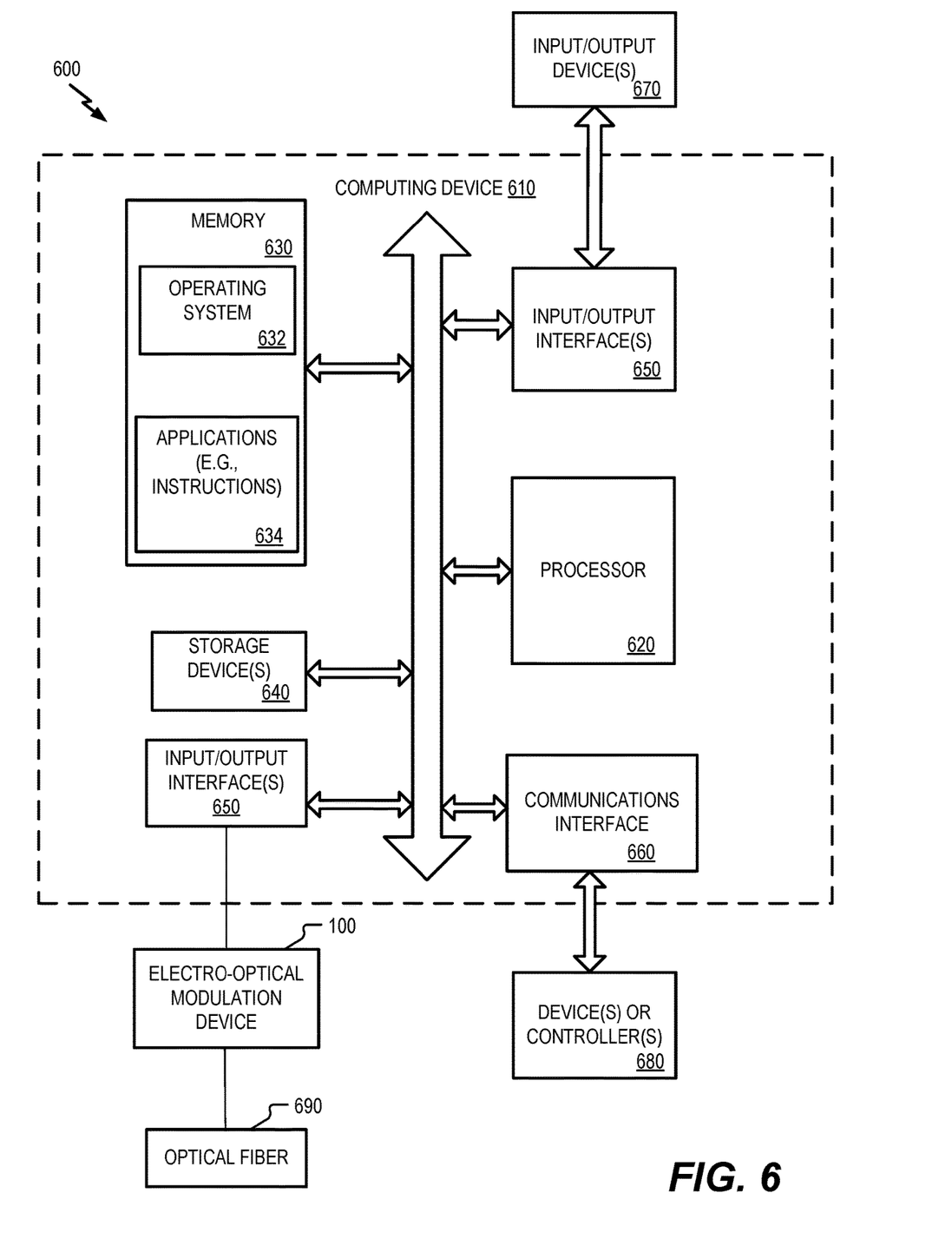
FIG. 6 is a block diagram of another example of system that includes the electro-optical modulator device of FIG. 1.

FIG. 6 is an illustration of a block diagram of a computing environment 600 including a general purpose computing device 610 configured to support embodiments of computer-implemented methods and computer-executable program instructions (or code) according to the present disclosure. For example, the computing device 610, or portions thereof, may execute instructions to perform, or cause device fabrication equipment to perform, operations as described with reference to FIGS. 4A-5.

The computing device 610 includes a processor 620. The processor 620 communicates with the system memory 630, one or more storage devices 640, one or more input/output interfaces 650, one or more communications interfaces 660, or a combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 includes an operating system 632, which may include a basic input/output system for booting the computing device 610 as well as a full operating system to enable the computing device 610 to interact with users, other programs, and other devices. The system memory 630 includes one or more applications 634 which are executable by the processor 620.

The processor 620 also communicates with one or more storage devices 640. For example, the one or more storage devices 640 can include nonvolatile storage devices, such as magnetic disks, optical disks, or flash memory devices. The storage devices 640 can include both removable and non-removable memory devices. The storage devices 640 can be configured to store an operating system, images of operating systems, applications, and program data. In a particular embodiment, the system memory 630, the storage devices 640, or both, include tangible computer-readable media.

The processor 620 communicates with one or more input/output interfaces 650 that enable the computing device 610 to communicate with one or more input/output devices 670 to facilitate user interaction. The input/output interfaces 650 may include, or be coupled to, the electro-optic modulator device 100 or the system 300 to transmit signals using modulated light via an optical fiber 690. The input/output interfaces 650 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 670 can include keyboards, pointing devices, displays, speakers, microphones, touch screens, and other devices. The processor 620 detects interaction events based on user input received via the input/output interfaces 650. Additionally, the processor 620 send a display to a display device via the input/output interfaces 650.

The processor 620 can communicate with one or more devices 680 via the one or more communications interfaces 660. The one or more communications interfaces 660 may include wired Ethernet interfaces, IEEE 802 wireless interfaces, other wireless communication interfaces, or other network interfaces. The one or more devices 680 can include host computers, servers, workstations, and other computing devices.

In accordance with disclosed implementations, an apparatus includes first means for a guiding an optical signal, such as the first optical waveguide region 104 of the substrate 102. The apparatus includes second means for guiding an optical signal, such as the second optical waveguide region 106 of the substrate 102. The first means for guiding and the second means for guiding have crystalline structures.

The apparatus also includes a first means for interfacing with a first electrode, a second means for interfacing with a second electrode, and a third means for interfacing with a third electrode, and each of the first means for interfacing, the second means for interfacing, and the third means for interfacing including material having a defective crystal structure or an amorphous structure. In an example, the first means for interfacing, the second means for interfacing, and the third means for interfacing including material correspond to the first electrode interface region 110, the second electrode interface region 112, and the third electrode interface region 114, respectively.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An electro-optic modulator device comprising:
   a substrate comprising:
   a first optical waveguide region and a second optical waveguide region, wherein substrate material of the first optical waveguide region and the second optical waveguide region have crystalline structures; and
   a first electrode interface region on a first side of the first optical waveguide region, a second electrode interface region of the substrate on a second side of the first optical waveguide region and on a first side of the second optical waveguide region, and a third electrode interface region on a second side of the second optical waveguide region, wherein the substrate material of each of the first electrode interface region, the second electrode interface region, and the third electrode interface region has a defective crystal structure or an amorphous structure;
   a first electrode directly coupled to the first electrode interface region;
   a second electrode directly coupled to the second electrode interface region, wherein the first electrode interface region, the second electrode interface region, and the third electrode interface region are dimensioned to cause an electromagnetic signal provided to the second electrode to propagate with a second phase velocity that is substantially equal to a first phase velocity of light in the first optical waveguide region; and
   a third electrode directly coupled to the third electrode interface region.

2. The electro-optic modulator device of claim 1, wherein the crystalline structures are electro-optic crystalline structures, and wherein each of the first electrode interface region, the second electrode interface region, and the third electrode interface region have reduced relative permittivity as compared to the first optical waveguide region and the second optical waveguide region.

3. The electro-optic modulator device of claim 1, further comprising a non-optical substrate bonded to the substrate.

4. The electro-optic modulator device of claim 3, further comprising a gap between the substrate and the non-optical substrate under the second electrode.

5. The electro-optic modulator device of claim 1, wherein the substrate further defines an input optical splitter waveguide region and an output optical combiner waveguide region, and wherein the first optical waveguide region, the second optical waveguide region, the input optical splitter waveguide region, and the output optical combiner waveguide region together define an optical interferometry path.

6. The electro-optic modulator device of claim 1, wherein at least one of the first electrode interface region, the second electrode interface region, or the third electrode interface region corresponds to an ion implant region of the substrate in which crystal defects are introduced to form the defective crystal structure or amorphous structure with reduced relative permittivity as compared to the first optical waveguide region and the second optical waveguide region.

7. The electro-optic modulator device of claim 1, wherein the substrate comprises at least one of $LiNbO_3$, $BaTiO_3$, $LiTaO_3$, KTP, $KNbO_3$, a Lead Lanthanum Zirconium Titanate (PLZT)-type material, or a Barium Strontium Titanate (BST)-type material.

8. The electro-optic modulator device of claim 7, wherein the first electrode interface region, the second electrode interface region, and the third electrode interface region comprise at least one of H, C, Si, Ge, F, Cl, Ar, Kr, or Xe as inclusions disrupting a lattice structure of the substrate.

9. The electro-optic modulator device of claim 1, wherein each of a first cross-section of the first optical waveguide region and a second cross-section of the second optical waveguide region has a characteristic dimension greater than or equal to 9 micrometers.

10. The electro-optic modulator device of claim 1, wherein a portion of the substrate that exhibits an electro-optical effect has a thickness greater than or equal to 3 micrometers in a direction orthogonal to an optical waveguide propagation direction of the first optical waveguide region.

11. The electro-optic modulator device of claim 1, wherein the first optical waveguide region and the second optical waveguide region include diffused titanium.

12. A system to modulate signals carried via optical fiber, the system comprising:
 a first coupler configured to couple to a first optical fiber;
 a second coupler configured to couple to a second optical fiber; and
 an electro-optic modulator device coupled to the first coupler and to the second coupler, the electro-optic modulator device comprising a first electrode, a second electrode, a third electrode, and a substrate, wherein the substrate comprises:
  a first optical waveguide region;
  a second optical waveguide region, wherein the first optical waveguide region and the second optical waveguide region comprise substrate material with crystalline structures;
  a first electrode interface region on a first side of the first optical waveguide region, the first electrode coupled to the first electrode interface region;
  a second electrode interface region on a second side of the first optical waveguide region and a first side of the second optical waveguide region, the second electrode coupled to the second electrode interface region; and
  a third electrode interface region on a second side of the second optical waveguide region, the third electrode coupled to the third electrode interface region, wherein the first electrode interface region, the second electrode interface region, and the third electrode interface region comprises the substrate material with a defective crystal structure or an amorphous structure, and wherein the first electrode interface region, the second electrode interface region, and the third electrode interface region are dimensioned to cause an electromagnetic signal provided to the second electrode to propagate with a second phase velocity that is substantially equal to a first phase velocity of light in the first optical waveguide region.

13. The system of claim 12, wherein the substrate further defines an input optical splitter waveguide region coupled to the first optical waveguide region and to the second optical waveguide region.

14. The system of claim 13, wherein the substrate further defines an output optical combiner waveguide region coupled to the first optical waveguide region and to the second optical waveguide region.

15. The system of claim 12, wherein the substrate comprises at least one of $LiNbO_3$, $BaTiO_3$, $LiTaO_3$, KTP, $KNbO_3$, a Lead Lanthanum Zirconium Titanate (PLZT)-type material, or a Barium Strontium Titanate (BST)-type material.

16. The system of claim 12, wherein the first electrode interface region, the second electrode interface region, and the third electrode interface region comprise at least one of H, C, Si, Ge, F, Cl, Ar, Kr, or Xe as inclusions disrupting a lattice structure of the substrate and reducing relative permittivity as compared to the first optical waveguide region and the second optical waveguide region.

17. The system of claim 12, wherein the substrate has a thickness in a direction orthogonal to a propagation direction of the first optical waveguide region, the thickness greater than or equal to 3 micrometers.

18. A method of forming an electro-optic modulator, the method comprising:
 forming a first optical waveguide region and a second optical waveguide region in a substrate;
 forming a plurality of electrode interface regions in the substrate by selective ion implantation of materials to form defects reducing an electric permittivity in a lattice structure of the substrate, wherein the plurality of electrode interface regions include a first electrode interface region on a first side of the first optical waveguide region, a second electrode interface region on a first side of the second optical waveguide region, and a third electrode interface region on a second side of the second optical waveguide region; and
 forming a plurality of electrodes including one electrode, respectively, directly on each electrode interface region of the plurality of electrode interface regions, wherein the first electrode interface region, the second electrode interface region, and the third electrode interface region are dimensioned to cause an electromagnetic signal provided to an electrode of the plurality of electrodes to propagate with a second phase velocity that is substantially equal to a first phase velocity of light in the first optical waveguide region.

19. The method of claim 18, wherein said forming the first optical waveguide region and the second optical waveguide region comprise, prior to forming the plurality of electrode interface regions, at least one of:
 diffusing titanium into at least the first optical waveguide region and the second optical waveguide region; or
 performing proton exchange into at least the first optical waveguide region and the second optical waveguide region.

20. The method of claim 19, wherein the electrode interface regions are formed to be adjacent to the first optical waveguide region and the second optical waveguide region without overlapping the first optical waveguide region and the second optical waveguide region.

* * * * *